United States Patent
Putzolu

(10) Patent No.: US 7,054,950 B2
(45) Date of Patent: May 30, 2006

(54) NETWORK THREAD SCHEDULING

(75) Inventor: David M. Putzolu, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 10/123,622

(22) Filed: Apr. 15, 2002

(65) Prior Publication Data

US 2003/0195916 A1    Oct. 16, 2003

(51) Int. Cl.
*G06F 15/173* (2006.01)
(52) U.S. Cl. ............... 709/238; 709/233; 709/234
(58) Field of Classification Search ............... 709/238
See application file for complete search history.

(56) References Cited

U.S. PATENT DOCUMENTS 5,872,783 A * 2/1999 Chin ............ 370/395.32
5,956,721 A * 9/1999 Douceur et al. ............ 707/10
6,356,951 B1 * 3/2002 Gentry, Jr. .................. 709/250
6,798,743 B1 * 9/2004 Ma et al. ..................... 370/235
2003/0093555 A1 * 5/2003 Harding-Jones et al. .... 709/238

OTHER PUBLICATIONS

Rosen, E. et al. "RFC 3031: Multiprotocol Label Switching Architecture." Jan., 2001. Network Working Group, RFC 3031.*
C. Hopps, *Analysis of an Equal-Cost Multi-Path Algorithm*, Nov. 2000.

* cited by examiner

*Primary Examiner*—Rupal Dharia
*Assistant Examiner*—Nicholas R. Taylor
(74) *Attorney, Agent, or Firm*—Fish & Richardson P.C.

(57) ABSTRACT

A method, system or product that identifies data packets with a common characteristic and routes all data packets having the same characteristic to the same thread of execution or device in a system which processes data packets in parallel.

34 Claims, 3 Drawing Sheets

NETWORK THREAD SCHEDULING

TECHNICAL FIELD

This description relates to computer networks.

BACKGROUND

Users of computer networks often want a rich variety of network services while also demanding high-speed data access. But network services take processing time that tends to slow the data delivery rate.

One way to achieve both high-speed and high-performance data packet processing is through parallelism or multi-threading in which network devices execute more than one thread simultaneously. Multi-threading is useful when a single task takes so long to complete that processing packets serially would slow down the overall packet throughput of a system too much.

During multi-threading, data packets sometimes flow into a multi-threaded task in one order (for example, P1, then P2) and flow out of the multi-threaded task in a different order (P2, then P1). This reordering can occur when the task is performed on P1 in one thread more slowly than the performance of the task on packet P2 in another thread. The different speeds of processing can result from the contention between threads for shared resources, such as memory bus access. Packet reordering is undesirable if the two data packets, P1 and P2, are bound for the same host.

Techniques that have been proposed to prevent packet reordering include adding hardware support, using only single-threaded processing, guaranteeing execution time per thread or using barrier or other synchronization mechanisms to ensure sequential processing of packets.

DETAILED DESCRIPTION

A basic mechanism for avoiding per-host packet reordering in a multi-threaded system ensures that packets en route to or from the same host will not be reordered even in the presence of semi-random (or even random) per-thread and per-task completion times.

Figure 1:
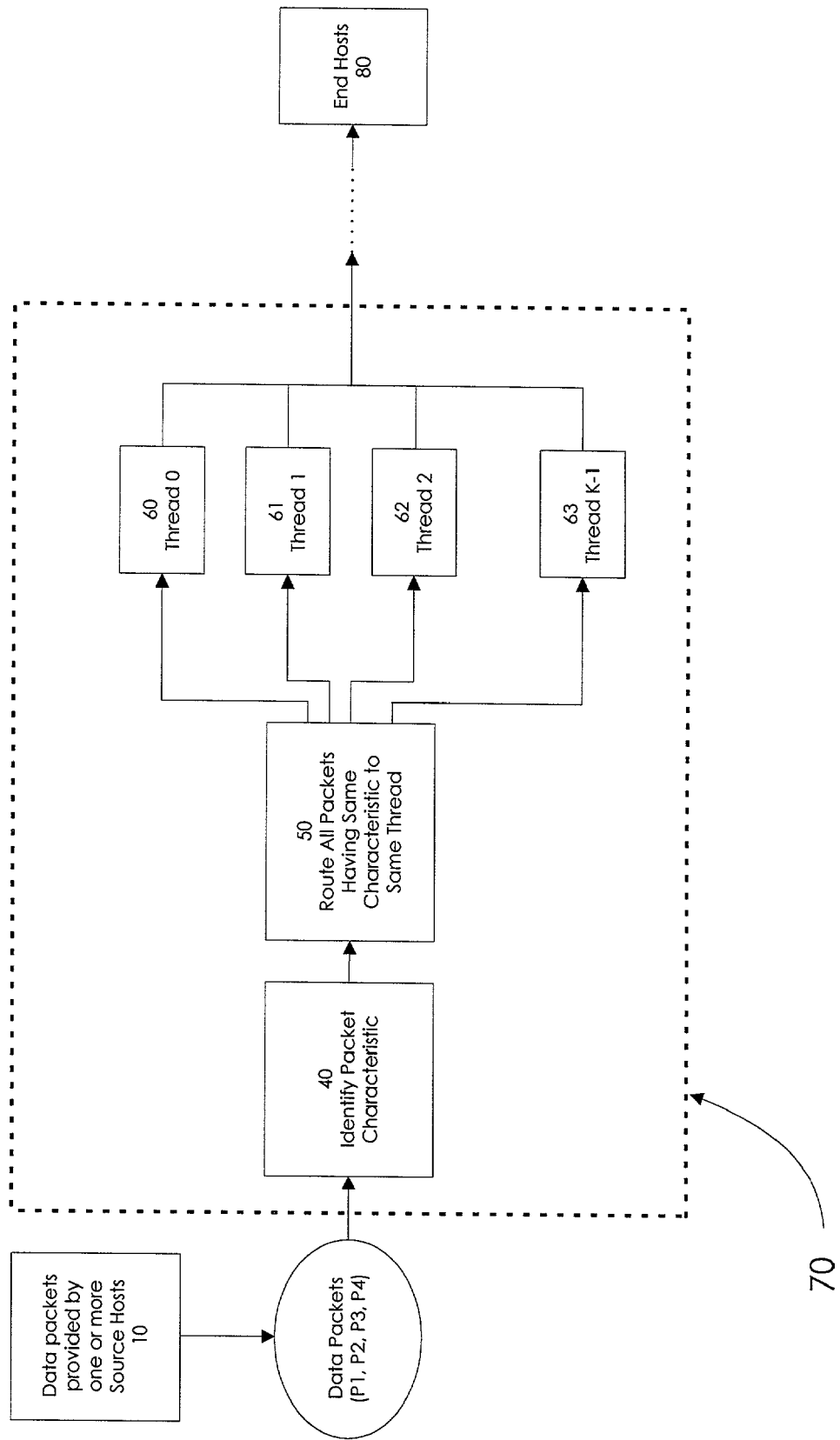
FIG. 1 is a flow chart of a basic thread routing mechanism.

As shown in FIG. 1, in some implementations, a number of hosts 10 provide a stream of data packets, P1, P2, P3, P4, to a network. A number of tasks, 40, 50, including a multi-threaded task, 60–63, are performed on the data packets within a network device 70 as they travel across the network. Eventually, the data packets are delivered to their respective destination end hosts 80.

Referring again to FIG. 1, in a basic mechanism to avoid reordering of packets destined for a host, a first function 40 identifies a characteristic about each packet and a second function 50 routes all packets having the given characteristic to the same thread 60, 61, 62, 63. This ensures that packets having the given characteristic will be processed serially by the same thread and thus remain in order with respect to one another.

The characteristic identified by the first function 40 should distinguish which packets within the overall stream of packets 30 should not be reordered with respect to one another. For example, the first function 40 may characterize each data packet according to its destination address, thereby ensuring serial processing of all data packets bound for the same destination. Similarly, the first function 40 may characterize each data packet according to its source address, which, again, ensures that data packets delivered to an end host from any one source will remain in order.

Figure 2:
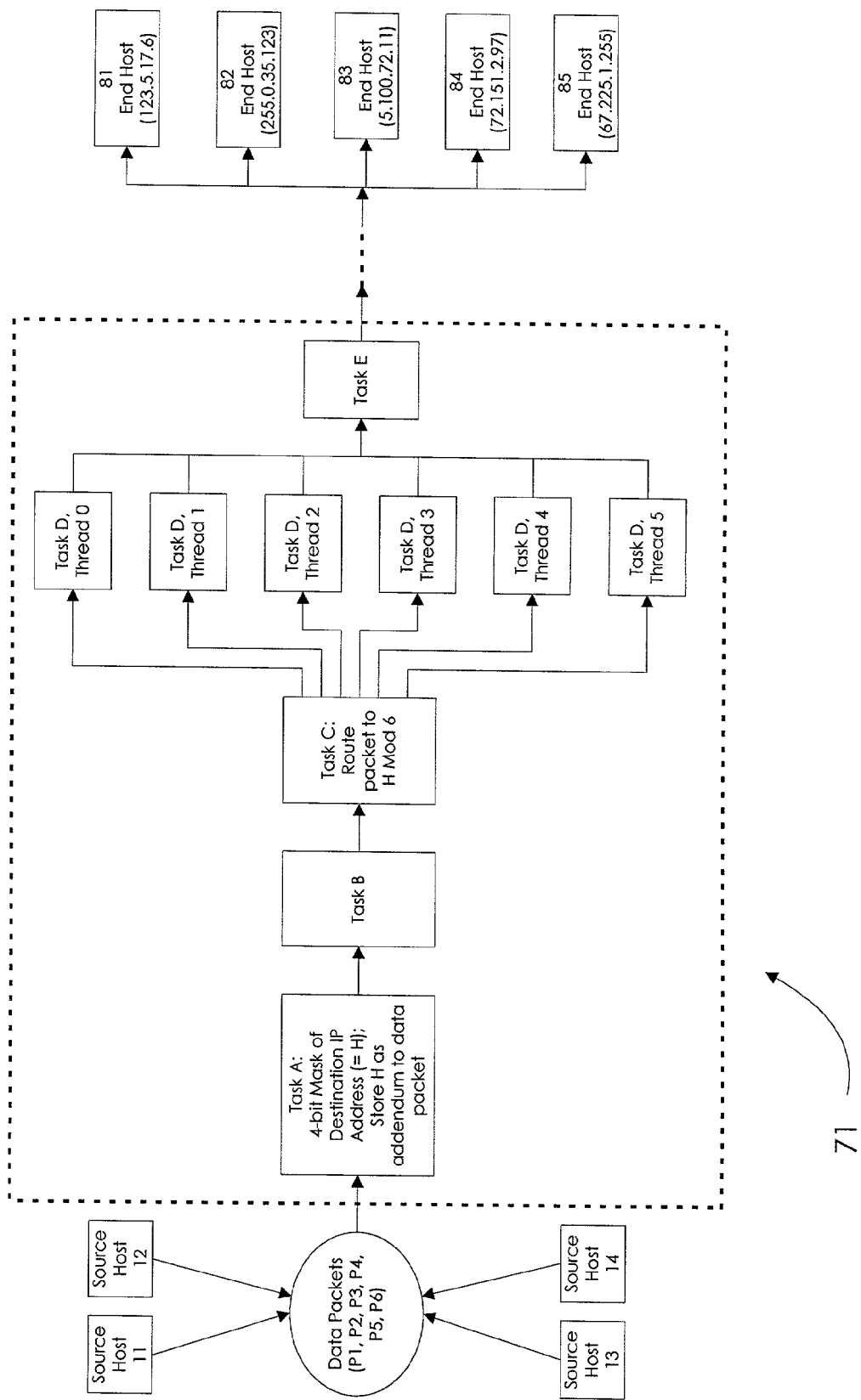
FIG. 2 is a flow chart of a thread routing mechanism with a series of network tasks.

In the example implementation of FIG. 2, source hosts, 11, 12, 13 and 14 provide a stream of data packets, P1, P2, P3, P4, P5 and P6 destined for transmission over the Internet. The stream of data packets, P1, P2, P3, P4, P5 and P6, flow through a series of tasks, Tasks A–E, including a six-threaded task, Task D, in a network device 71. After completing the series of tasks, Tasks A–E, the data packets flow out of the network device 71 and are eventually delivered to the end-host, 81, 82, 83, 84, 85, corresponding to the destination Internet Protocol address contained in each data packet.

Task A performs a four-bit masking of the least significant bits of the destination Internet Protocol (IP) address in each data packet. The four-bit mask produces a data packet identifier, H. Note that in this example, the data packet identifier, H, is an integer valued between 0 and 15, that effectively organizes the packets into 16 groups according to their destination addresses. The groups can then be distributed to the threads of any of the tasks according to the identifier H. To utilize all threads that make up any of the tasks in the processing of the packets, the number of bits chosen for the mask should correspond to at least the maximum value of the number of threads used for any one task. In the example of FIG. 2, there are 16 possible H values and only 6 threads in Task D.

Task A also stores the packet identifier, H, as an addendum to each packet by adding a byte of data containing H between each data packet in the stream of data packets. Therefore, the data packets may flow into Task A as P1, P2, P3, P4, P5, and P6 and leaving Task A as P1, H1, P2, H2, P3, H3, P4, H4, P5, H5, and P6, H6, where H1 is the data packet identifier for packet P1, H2 is the data packet identifier to P2 and so on. While the example illustrated in FIG. 2 shows each data packet identifier stored AFTER its respective packet as an addendum, another embodiment may store each data packet identifier BEFORE its respective packet as a predendum. By storing the data packet identifier, H, for each packet, it can be looked up as the packets flow through a series of multi-threaded tasks within the network device 80.

After completing Task A, the data packets continue to flow to other tasks within the network device such as Task B. When the packets reach a task that immediately precedes a multithreaded task, for example, Task C, the task routes the packets to thread H Modulo K of the next Task D, where K is the number of threads in Task D. Threads 0–5 of Task D execute the same task (Task D) on several data packets at the same time. The data packets then flow out of the threads in an order determined by how fast the respective threads complete the task, and continue to the next task, Task E. After completing the series of tasks, Tasks A–E, the data packets are delivered to the end-host, 81, 82, 83, 84, 85, at the destination Internet Protocol address contained in each data packet.

The following chart illustrates the operation of the thread routing mechanism depicted in FIG. 2 as data packets P1-P6 flow through the network:

| Packet Number | Destination IP address of packet | Last 4 bits of IP address | Value of H (in base 10) | Thread where packet is sent (using H Mod K) |
| --- | --- | --- | --- | --- |
| P1 | 123.5.17.6 | 0110 | 6 | 0 |
| P2 | 255.0.35.122 | 1010 | 10 | 4 |
| P3 | 5.100.72.11 | 1011 | 11 | 5 |
| P4 | 123.5.17.6 | 0110 | 6 | 0 |
| P5 | 72.151.2.97 | 0001 | 1 | 1 |
| P6 | 67.225.1.255 | 1111 | 15 | 3 |

In the above illustration, packets P1 and P4 in the data stream are bound for the same IP address (i.e., 123.5.17.6). Task A, the four-bit masking of the IP address, produces the same data packet identifier, H, for both packet P1 and P4. By having the same packet identifier, H, Task C will send P1 and P4 to the same thread, Thread 0 in this case. Since P1 and P4 are sent to the same thread, they are processed in series, and, therefore, will not be reordered relative to each other. This process ensures that the end-host will receive its data packets in the correct order assuming that no other intervening processing causes reordering.

Using a mask of the destination IP address, as illustrated by the four-bit mask in FIG. 2, to produce the packet identifier, H, gives reasonably good randomness for any system where there are a relatively large number of end hosts. However, another implementation might use a hash of the IP address and/or port numbers to distinguish the packets in systems in which the number of end hosts is relatively small.

Figure 3:
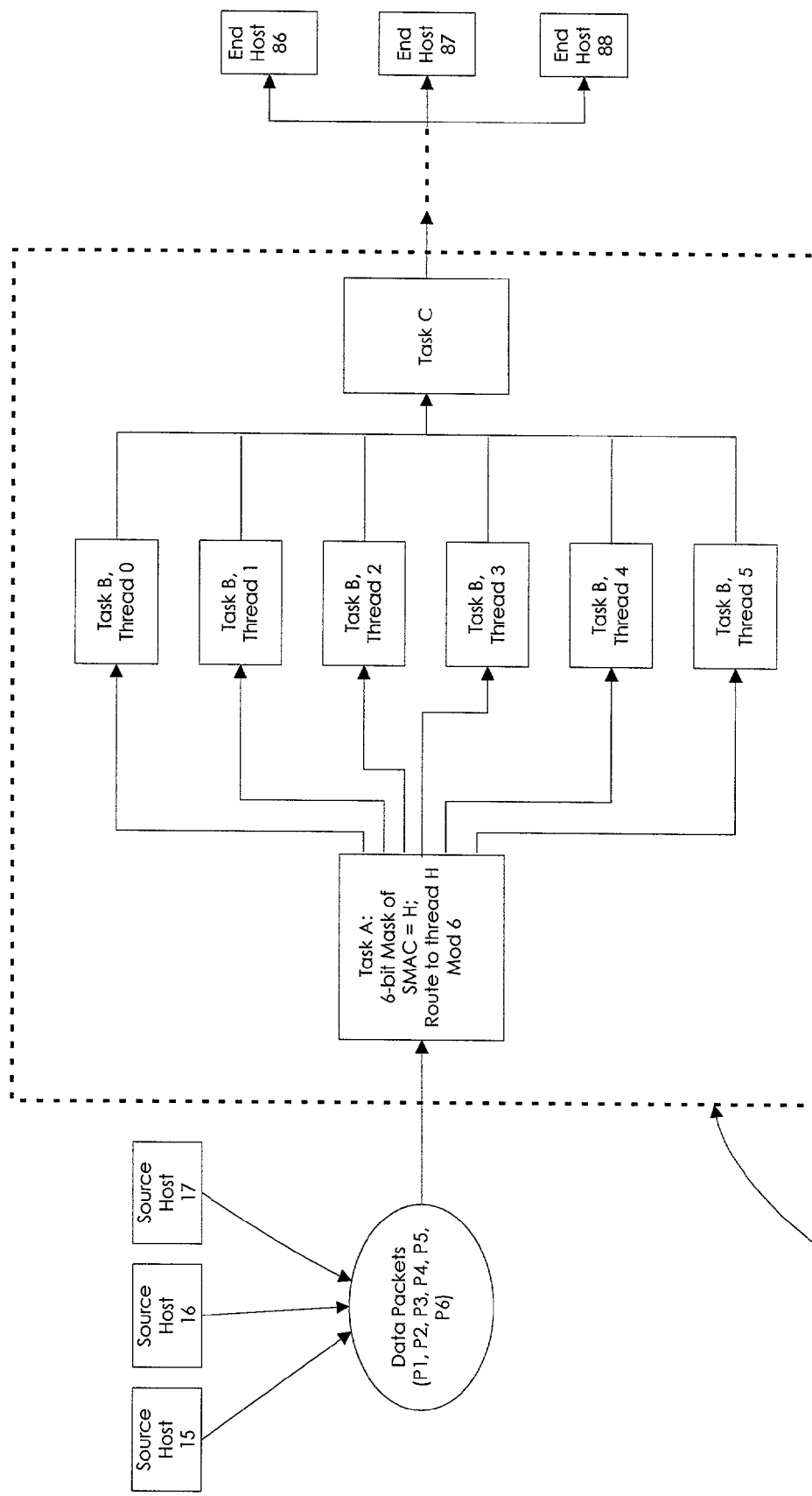
FIG. 3 is a flow chart of another thread routing mechanism.

In the alternate embodiment shown in FIG. 3, source hosts, 15, 16, 17, provide a stream of data packets, P1, P2, P3, P4, P5 and P6 destined for transmission over an Ethernet local area network. The stream of data packets, P1, P2, P3, P4, P5 and P6, flow through a series of tasks, Tasks A–C, including a six-threaded task, Task B, in a network device 72. After completing the tasks within the network device 72, the data packets are eventually delivered to their respective end-hosts, 86, 87, 88. In this embodiment, H is calculated as a six-bit lower order mask of the Source Media Access Control (SMAC) in an Ethernet network immediately prior to being routed through a multi-threaded task.

In addition to the implementation described above. Other implementations are also within the scope of the following claims.

For example, many other functions besides a mask or hash of the destination IP address may be used to produce a packet identifier. A mask or hash of some bits at any appropriate protocol layer could be used to distinguish packets and direct them to a particular thread. In the case of a Multi-Protocol Label Switching (MPLS) network, the label at the top of the stack could be used. In the case of an Ethernet network, the Media Access Control (source or destination) address associated with each data packet could be used. In the case of an system which uses the Asynchronous Transfer Mode (ATM) protocol, the Virtual Path Identifier (VPI) or Virtual Channel Identifier (VCI) may be used. Again, a mask or hash of some bits at any appropriate protocol layer could be used to distinguish packets and direct them to a particular thread and the technique described should not be limited to only internet, MPLS, Ethernet, or ATM networks.

Other techniques besides the modulo function may be used to route packets with the same identifier to the same thread. For example, a series of binary AND or other logic gates may be used.

H may be handled in a variety of ways. For example, it may be stored as an addendum to the data packet by adding a byte of data containing H in between each data packet (as described in the example illustrated in FIG. 2), stored in a field within each data packet, stored in a register, or simply calculated immediately prior to being routed through a multi-threaded task.

The data processing technique described may be implemented in hardware, firmware, software, or a combination of them in network devices capable of parallel processing such as Network Processors with multiple microengines, multiple Network Processors, or multiple Application Specific Integrated Circuits.

What is claimed is:

1. A method comprising:
   identifying a common characteristic for each data packet; and
   routing data packets from one or more source hosts, which appear in an order in a series of data packets, to respective ones of a plurality of end hosts in a manner to preserve the order of at least some of the packets that are related by a common characteristic, wherein the routing comprises:
   applying a first function to the data packets to produce a data packet identifier H for each data packet;
   sending each data packet having a given data packet identifier to a same thread in a multi-threaded task; and
   using function H Modulo K to identify the same thread for the given data packet, wherein K comprises a number of threads in the multi-threaded task.

2. The method of claim 1, wherein the first function comprises a mask, the method further comprising corresponding a number of bits of the mask to at least a maximum value of a number of threads used for any multi-threaded task in the routing.

3. The method of claim 2, further comprising storing each data packet identifier, wherein all threads are utilized for the multi-threaded task.

4. The method of claim 3, wherein each data packet identifier is stored as an addendum to each data packet.

5. The method of claim 1 wherein the common characteristic comprises an identity of the end host to which the packets are bound.

6. The method of claim 1 wherein the common characteristic comprises an identity of the source host from which the data packets are coming.

7. The method of claim 1 wherein the function applied to each data packet comprises a mask of at least one bit of a destination Internet Protocol address associated with each data packet.

8. The method of claim 1 wherein the first function applied to each data packet comprises a mask of at least one bit of the Destination Media Access Control (DMAC) address associated with each packet in an Ethernet-based network.

9. The method of claim 1 wherein the first function applied to each data packet comprises a hash of at least one bit of the label associated with each packet provided by a label edge router in a Multi-Protocol Label Switching-based network.

10. The method of claim 1 wherein the first function applied to each data packet comprises a hash of at least one bit of the Virtual Path Identifier (VPI) associated with each packet in a network using Asynchronous Transfer Mode (ATM) technology.

11. The method of claim 1 wherein the threads comprise microengines within a network processor.

12. The method of claim 1 wherein the threads comprise multiple application specific integrated circuits.

13. A method comprising:
receiving a sequence of data packets;
applying a first function to the data packets to generate a data packet identifier H that classifies the packets into groups such that a sequential order of packets in each of the groups is to be maintained;
using the classification information in a second function to assign each group to a thread in a multi-threaded task, wherein the second function comprises H Modulo K, and wherein K comprises a number of threads in the multi-threaded task; and
routing the data packets classified in a given group to the assigned thread.

14. The method of claim 13, wherein the multi-threaded task processes the data packets in each thread in parallel.

15. The method of claim 14, wherein the first function comprises a mask of a destination address associated with each packet.

16. The method of claim 14, wherein the first function comprises a hash of a source address associated with each packet.

17. The method of claim 13, wherein the classification information is stored as an addendum to each data packet.

18. The method of claim 14, wherein the threads comprise microengines of a network processor.

19. A system comprising:
a packet identifier for data packets configured to use a first function based on a common characteristic of the data packets to produce a data packet identifier H for each data packet;
a router configured to send each data packet having given packet identifier to a common thread for a multi-threaded task, wherein the router is further configured to use function H modulo K to assign each data package to the respective common thread, and wherein K comprises a number of threads in the multi-threaded task; and
a processor configured to simultaneously process data packets in at least two threads of the multi-threaded task.

20. The system of claim 19 wherein the processor comprises an application specific integrated circuit.

21. The system of claim 19 wherein the processor comprises a network processor.

22. The system of claim 19 wherein the products of the first function are to be stored on a computer readable medium.

23. The system of claim 20 wherein the packet identifier is hard wired into the application specific integrated circuit.

24. The system of claim 19, wherein the first function comprises a mask, and wherein a number of bits of the mask corresponds to at least a maximum value of a number of threads used for any multi-threaded task processed by the processor.

25. The system of claim 19, wherein the common characteristic comprises an identity of an end host to which the packets are bound.

26. The system of claim 19, wherein the common characteristic comprises an identity of a source from where the packets are coming.

27. A computer program product residing on a computer readable medium having instructions stored thereon that, when executed, cause a processor to:
identify a common characteristic for each data packet; and
route data packets from one or more source hosts, which appear in an order in a series of data packets, to respective ones of a plurality of end hosts in a manner to preserve the order of at least some of the packets that are related by a common characteristic, wherein the routing comprises:
applying a first function to the data packets to produce a data packet identifier H for each data packet;
sending each data packet having a given data packet identifier to a same thread in a multi-threaded task; and
using function H Modulo K to identify the same thread for the given data packet, wherein K comprises a number of threads in the multi-threaded task.

28. The computer program product of claim 27, further causing the processor to:
store the data packet identifier for each data packet.

29. The computer program product of claim 28, wherein the first function to produce a data packet identifier comprises a mask of at least one bit of information associated with each data packet.

30. The computer program of claim 29, wherein the mask comprises at least one bit of the destination Internet Protocol address of each packet.

31. The computer program of claim 29, wherein the mask comprises at least one bit of the Virtual Channel Identifier in a network using Asynchronous Mode Transfer technology.

32. The computer program product of claim 27, wherein the first function comprises a hash of at least one bit of information associated with each data packet.

33. The computer program product of claim 27 wherein the processor comprises a multi-threaded network processor.

34. The computer program product of claim 33 wherein the multi-threaded network processor comprises a plurality of application specific integrated circuits.

* * * * *